W. S. POSEY.
ROTARY PLOW.
APPLICATION FILED APR. 6, 1911.

1,025,764.

Patented May 7, 1912.

4 SHEETS—SHEET 1.

Witnesses.
H. L. Opsahl
A. H. Opsahl

Inventor.
William S. Posey.
By his Attorneys.
William M. Merchant

UNITED STATES PATENT OFFICE.

WILLIAM S. POSEY, OF FRETTIM, NORTH DAKOTA, ASSIGNOR OF ONE-HALF TO THOMAS S. PRYSE, OF DAWSON, NORTH DAKOTA.

ROTARY PLOW.

1,025,764.

Specification of Letters Patent.

Patented May 7, 1912.

Application filed April 6, 1911. Serial No. 619,248.

*To all whom it may concern:*

Be it known that I, WILLIAM S. POSEY, a citizen of the United States, residing at Frettim, in the county of Kidder and State of North Dakota, have invented certain new and useful Improvements in Rotary Plows; and I do hereby declare the following to be a full, clear, and exact description of the invention, such as will enable others skilled in the art to which it appertains to make and use the same.

My invention has for its object to provide a simple, convenient and highly efficient rotary plow, and to this end, the invention consists of the novel devices and combination of devices, hereinafter described and defined in the claims.

In the accompanying drawings which illustrate the invention, like characters indicate like parts throughout the several views.

Figure 1:
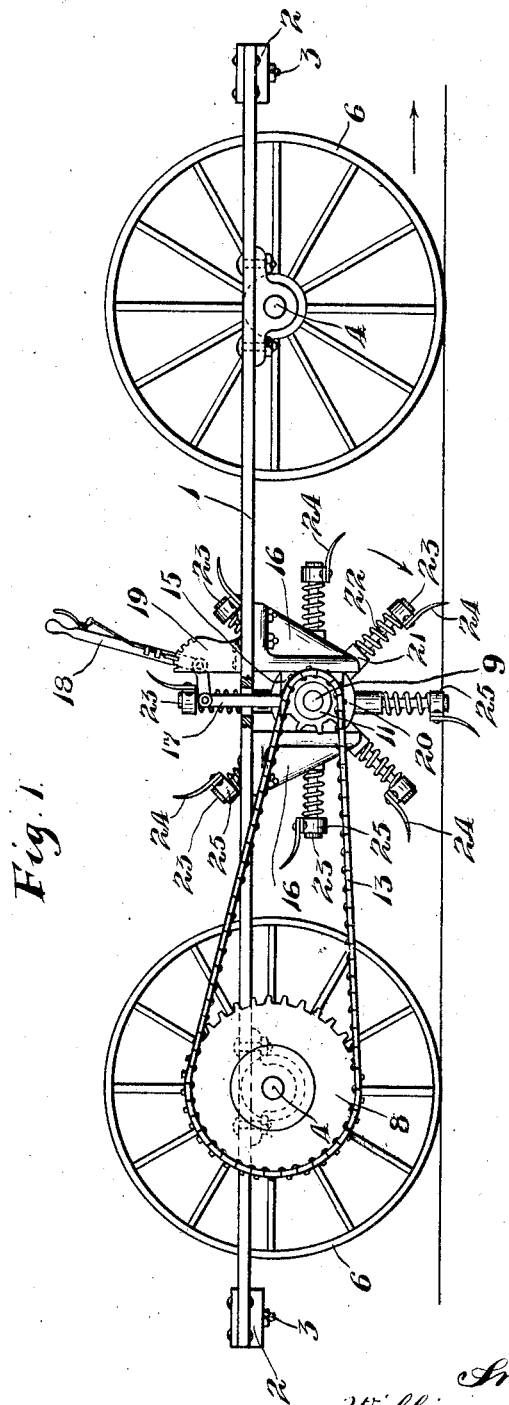
Figure 2:
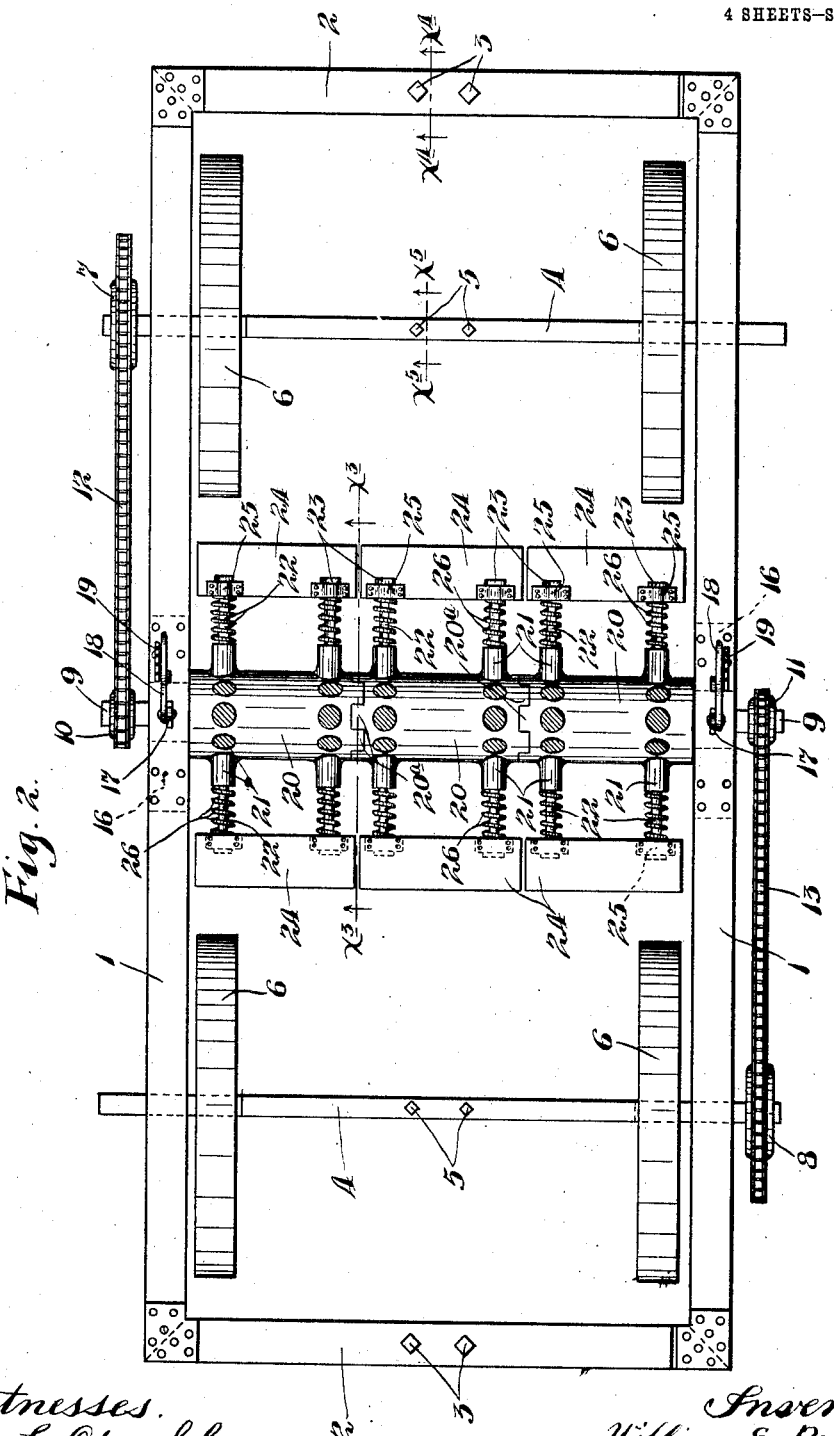
Figure 3:
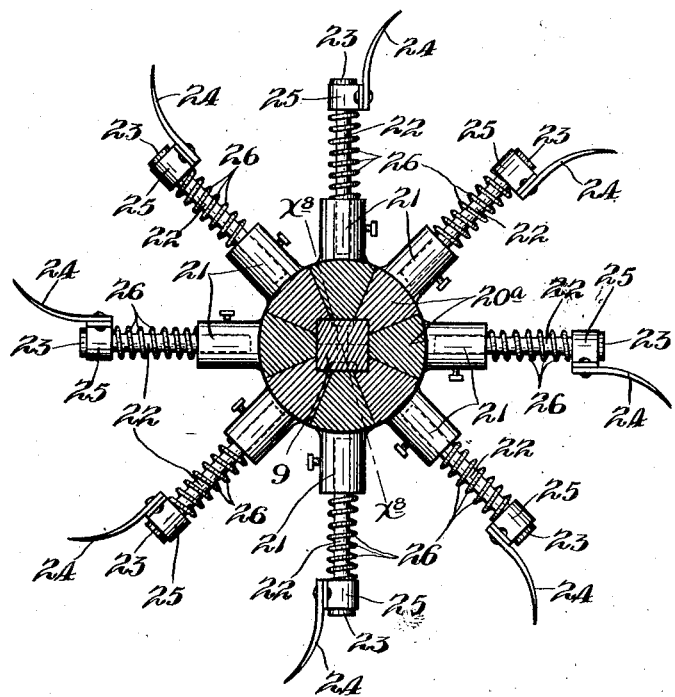
Figures 4, 5:
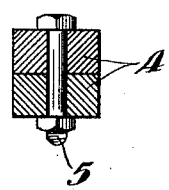
Figure 6:
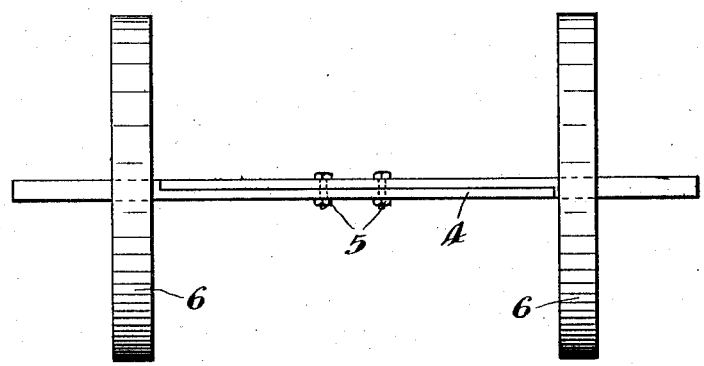
Figure 7:
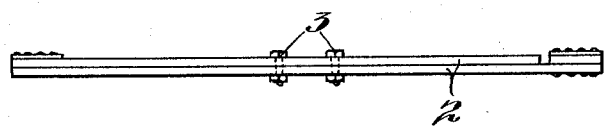
Figure 8:
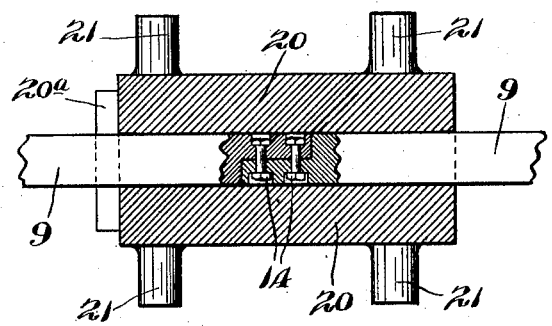

Referring to the drawings, Figure 1 is a view in side elevation showing the improved rotary plow; Fig. 2 is a plan view of the same with some parts sectioned; Fig. 3 is a vertical section taken on the line $x^3$ $x^3$ of Fig. 2; Fig. 4 is a detail section on the line $x^4$ $x^4$ of Fig. 2; Fig. 5 is a detail in section on the line $x^5$ $x^5$ of Fig. 2; Fig. 6 is a detail in rear elevation showing the rear wheels and rear axle; Fig. 7 is a detail in rear elevation showing the rear transverse bar of the machine frame; and Fig. 8 is a detail in section taken approximately on the line $x^8$ $x^8$ of Fig. 3, some parts shown in full and some parts being broken away.

For an important purpose which will hereinafter appear, the frame of the machine is made transversely adjustable, the rotary blade equipped plow drum is made extensible or longitudinally adjustable in a direction transverse of the machine, and preferably also, the axles of the truck are made longitudinally adjustable.
The machine frame, as shown, is a rectangular structure made up of side bars 1 and adjustable front and rear end bars 2, as best shown in Figs. 2 and 7. These front and rear end bars are each made up of a pair of overlapped metal bars provided with longitudinally spaced perforations and rigidly but adjustably connected by short nutted bolts 3 so that the entire machine frame may be adjusted to different widths.
The front and rear axles are preferably made alike and both are longitudinally adjustable, being made up each of a pair of overlapped members 4 having longitudinally spaced perforations, and rigidly but adjustably connected by short nutted bolts 5, as best shown in Figs. 2 and 6. The said axles 4 are journaled in suitable bearings on the side bars 1 and they are provided with traction wheels 6. The front axle 4 is provided at one side of the machine with a driving sprocket 7 and the rear axle is provided at the opposite side of the machine with a similar driving sprocket 8.

Journaled in suitable bearings on the side bars 1 of the machine frame, located between the front and rear axles and extended parallel thereto, is a drum driving shaft 9 provided at its ends with sprockets 10 and 11. A sprocket chain 12 runs over the sprockets 7 and 10, and a similar sprocket chain 13 runs over the sprockets 8 and 11, so that both the front and rear traction wheels 6 are rendered effective to drive the said drum shaft 9. This drum shaft 9 is preferably made rectangular in cross-section and it is made up of a multiplicity of longitudinally alined sections having overlapped ends detachably, but rigidly connected by nutted bolts 14, as best shown in Fig. 8. The said drum shaft 9 should be vertically adjustable, and hence, it is journaled to bearings 15 that are mounted for vertical movements between vertical guide brackets 16 that are rigidly secured to and depending from the side bars 1 of the machine frame. These vertically adjustable bearings 15 are connected to the lower ends of links 17, the upper ends of which are connected to the lower ends of latch levers 18 which, in turn, are pivoted to latch segments 19, rigidly secured on the said side bars 1. The latch levers 18 are adapted to be locked in different positions to the lock segment 19 and they serve to support the drum shaft 9 in different vertical positions, or for a purpose which will more clearly hereinafter appear.

The drum shaft 9 is extended through and carries a drum or large sleeve made up of a multiplicity of sections 20, which, at their abutting ends, are preferably provided with interlocking half-clutches 20ª. The outer ends of the outer sections 20 engage the inner faces of the vertically adjustable shaft bearings 15. The intermediate drum sections (of which there may be one or more) are of the same length as the intermediate sections of the drum shaft 9, and the axles 4 and the end bars 2 are made adjustable in units corresponding to the length of said intermediate drum sections. Otherwise stated, the machine frame and driving mechanisms are adapted to be adjusted to vary the width of the machine according to the number of drum sections applied to the drum shaft.

Each drum section 20 is provided with radially projecting pairs of hubs 21, in which, as shown, the inner ends of heavy radially extended arms or spokes 22 are rigidly secured. The spokes 22 are provided at their outer ends with heads 23. For each pair of spokes 22 there is a plow blade 24 provided on the inner edges and at their backs with heavy sleeves or hubs 25 that are mounted for radial sliding movements on the said spokes. Heavy coiled springs 26 placed on the spokes 22 and compressed between the hubs 21 and 25, yieldingly hold the plow blades 24 outward to their extreme limits, as shown in the drawings, and as best shown in Fig. 3. The plow blades 24 are of approximately the same length as the drum sections 20, and the plow blades of one drum section are preferably alined with plow blades of other sections.

The direction in which the plow is adapted to travel and the direction in which the blade equipped drum is arranged to be rotated by the connections described, are indicated by arrows marked on Fig. 1. It is important to note that the said drum is rotated in a direction in which it tends to force the machine forward in the direction of its travel and this, as is evident, very greatly reduces the power required to throw the machine forward. In fact, the plow blades are given a peripheral travel which is several times greater than the peripheral travel of the traction wheels so that the sod or earth uplifted by the blades will be thrown upward and rearward and thereby disintegrated and thoroughly mixed and deposited in loose form at the rear of the machine. If any of the plow blades should be thrown against a rock, rut or other obstruction in the ground through which the blade cannot cut, it may yield and move radially toward the axis of the drum shaft and thus prevent breaking of the blade. The depth of cut may be varied by vertical adjustments of the drum.

The power used to impart traveling movement to the machine and rotary movement to the blade equipped drum may be a traction engine carried by the machine, or the machine shown may be hitched to the rear or pushed in front of a traction engine. It may even be drawn forward by horses so far as my invention is concerned.

It is, of course, usually desirable to cut as wide a furrow as possible, and the width of the furrow that can be cut with a given source of power will depend on the condition of the soil. For instance, in soft soil, a wider furrow can be cut than in dry hard soil, and a wider furrow can be cut in previously plowed ground than can be cut through sod. To adapt the machine for these conditions of soil, it is made adjustable, as already described. It is evident that by altering or moving the intermediate drum sections and correspondingly adjusting the other parts of the machine, the width of the furrow which will be cut by the machine may be very greatly varied.

What I claim is:

1. In a machine of the kind described, the combination with a truck, of a rotary drum carried by the truck frame and provided with radially projecting and transversely spaced pairs of spokes, cutting blades having bearing hubs slidably mounted on said pairs of spokes, and springs on the said spokes yieldingly pressing the said blades radially outward, substantially as described.

2. In a machine of the kind described, the combination with a truck, of a rotary drum carried by the truck frame and provided with radially projecting and transversely spaced pairs of hubs, headed spokes secured to said hubs, cutting blades having bearing heads slidably mounted on said headed spokes, and springs on the said spokes yieldingly pressing the said blades radially outward against the heads of said spokes, substantially as described.

3. In a machine of the kind described, the combination with a truck, of a rotary drum carried by the truck frame and provided with radially projecting and transversely spaced pairs of hubs, headed spokes adjustably secured to said hubs, cutting blades having bearing heads slidably mounted on said headed spokes, and springs on the said spokes yieldingly pressing the said blades radially outward against the heads of said spokes, substantially as described.

In testimony whereof I affix my signature in presence of two witnesses.

WILLIAM S. POSEY.

Witnesses:
F. W. LEETE,
R. N. KOOKER.